March 17, 1936.  P. E. HAWKINSON  2,034,618
TIRE RETREADING APPARATUS
Filed April 18, 1934  2 Sheets-Sheet 1
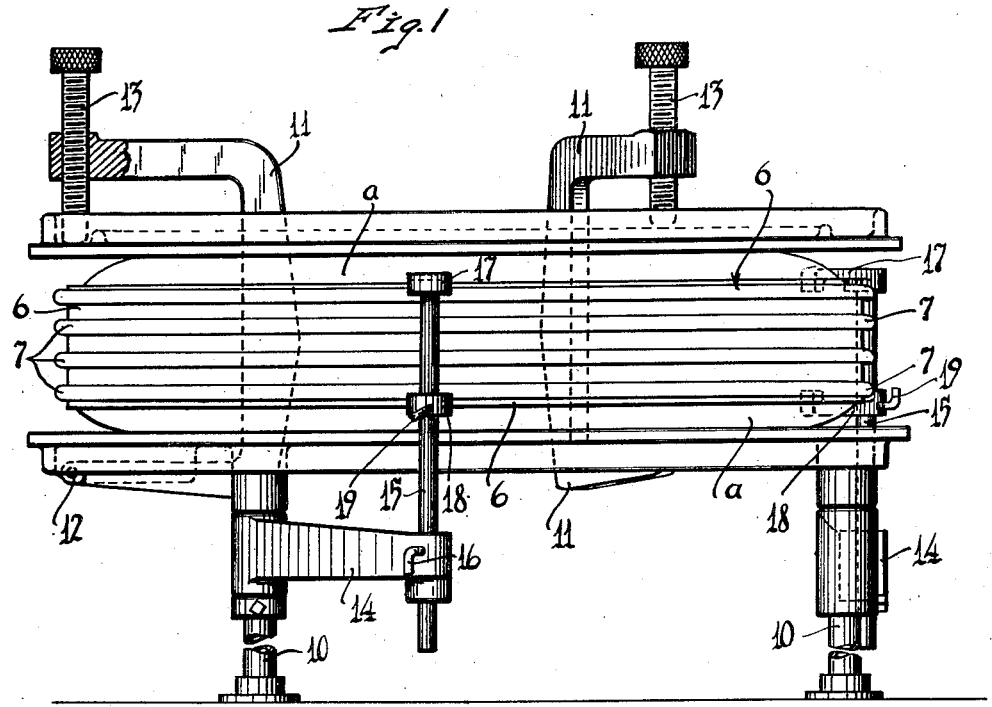
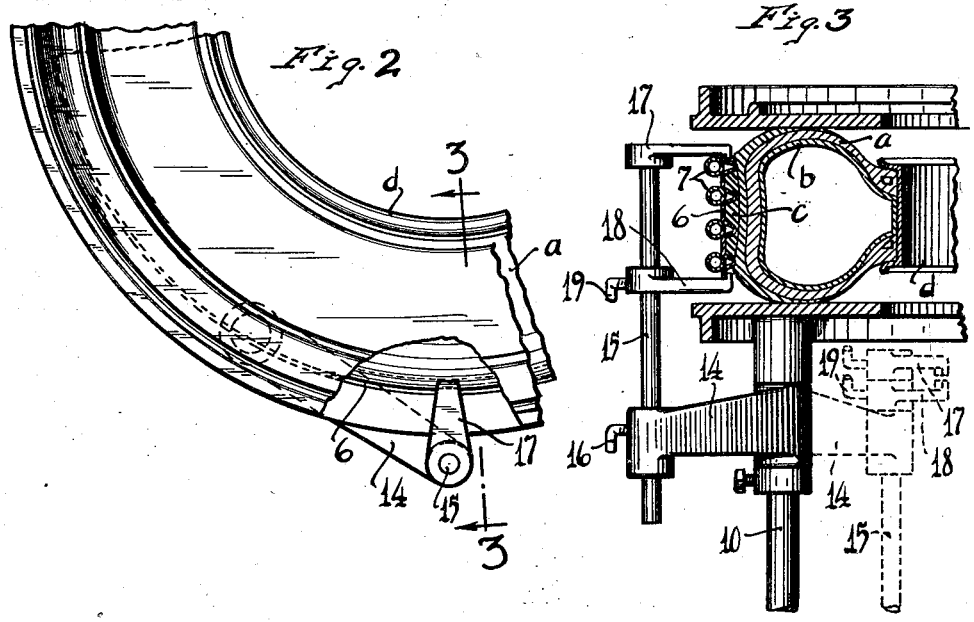
Inventor
Paul E. Hawkinson
By his Attorneys

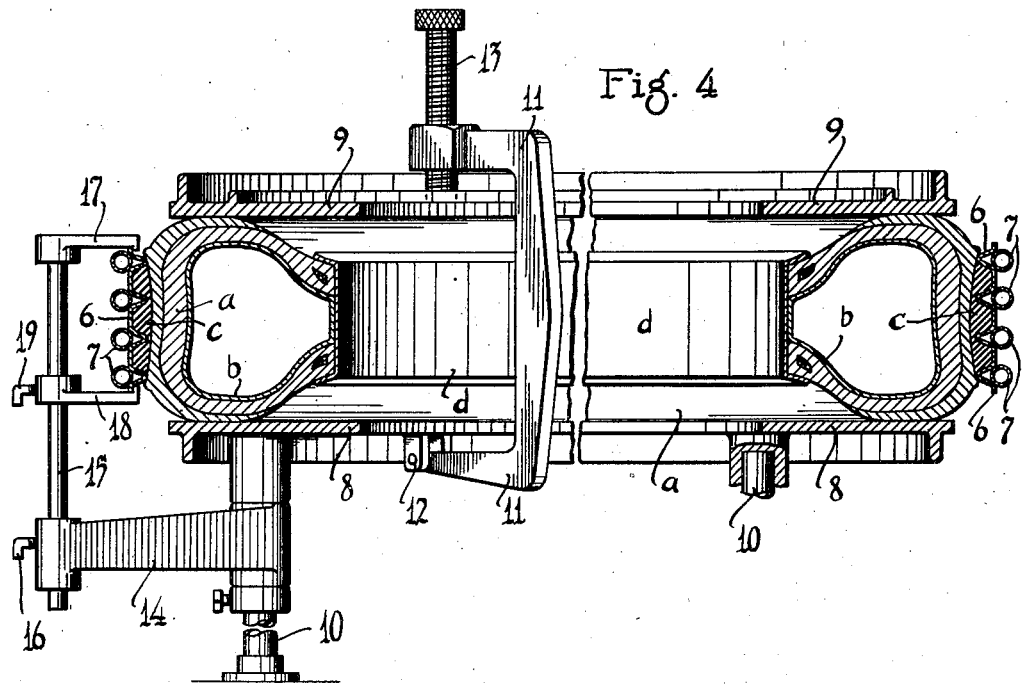
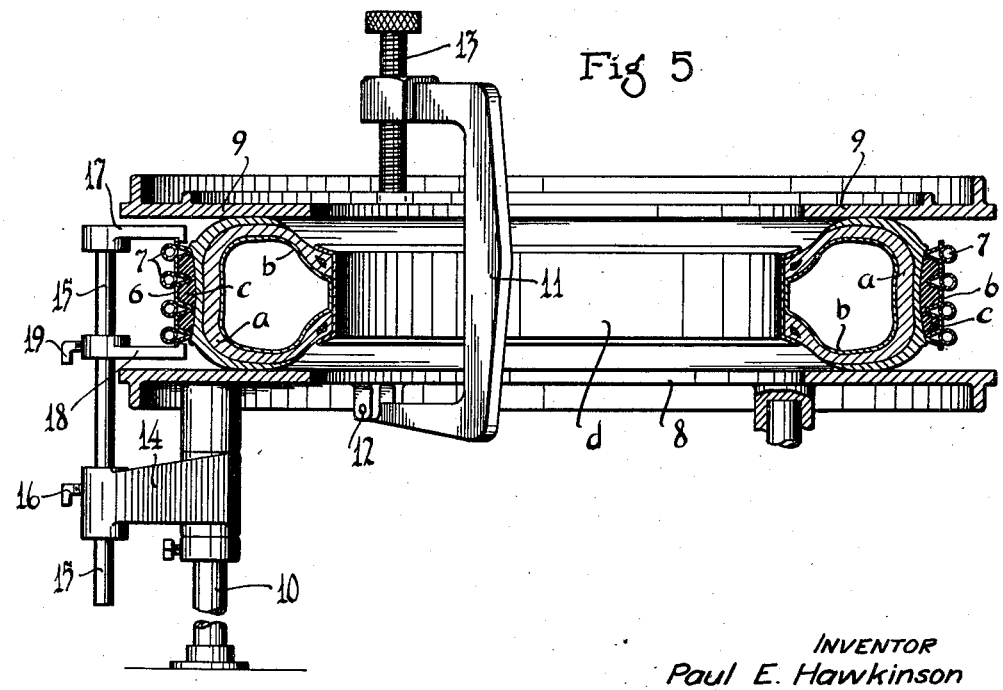

Patented Mar. 17, 1936

2,034,618

UNITED STATES PATENT OFFICE 2,034,618

TIRE RETREADING APPARATUS

Paul E. Hawkinson, Minneapolis, Minn., assignor to Paul E. Hawkinson Company, Minneapolis, Minn., a corporation of Minnesota Application April 18, 1934, Serial No. 721,157

11 Claims. (Cl. 18—18)

My present invention relates to apparatus for retreading the casings of pneumatic tires such as used in motor-propelled vehicles and is in the nature of an improvement on or further development of the apparatus for retreading tire casings, disclosed and claimed in my prior patent No. 1,917,262, issued of date July 11, 1933, and which present apparatus, as well as the apparatus of my patent are especially adapted for carrying into effect or utilizing the "Method of retreading tire casings", disclosed and claimed in my prior Patent No. 1,917,261, also issued of said date July 11, 1933. The present improved apparatus involves features which (a) Reduce the number of parts necessary for the retreading of tire casings that vary materially in circumference and in cross-sectional dimensions;

(b) Increase the facility and ease with which the tire casings may be retreaded; and (c) Improve the quality of the retread produced in the use of the apparatus.

Certain of the features of the present apparatus are, in a broad sense, those of the apparatus of my prior patents. In accomplishing the above noted feature a, I provide, in connection with an annular mold (that is engageable circumferentially around a tire having a greater transverse diameter than the width of the mold), pressure plates having parallel faces that are engageable with the sides of the tire casing and are so extended radially of the mold that they will engage the sides of the tires, at their maximum transverse diameters, regardless of varying circumferential dimensions of the tires provided, of course, that the maximum transverse diameters of the tires are greater than that of the mold. In connection with the pressure plates, there are confining devices, such as adjustable clamps, that confine the plates against separation under pressure exerted by the tire. The same pressure plates can be used for the retreading of tires of greatly varying dimensions and which require molds of various different widths and circumference. Such an arrangement permits the pressure plates to engage the tire casings at their maximum transverse diameter both when the molds are of such relatively small diameter that they are located between the pressure plates and when the molds are of such circumference and diameter that they are positioned outside of the pressure plates.

The above noted feature b is accomplished in part by arranging the pressure plates and the mold in horizontal planes, with the lower pressure plate relatively fixed and serving as a table on which the tire may be laid. Also this object is further facilitated by making the pressure plates annular in form and anchoring suitable pressure plate confining means to the lower tableforming plate and extending the same upward through the openings in the two plates for engagement with the upper pressure plate.

In carrying out above noted object or feature c, mold-anchoring devices are provided which serve to hold the mold against shifting or drifting movements in respect to the pressure plates, during the vulcanizing operation, and while the retread rubber is in soft or semi-fluid condition. To adapt these anchors to molds of varying width and circumference and diameter, the said anchors are made bodily shiftable in respect to the faces of the pressure plates and in respect to the common axis of the pressure plate and mold and are provided with mold-gripping arms or projections, at least one of which is adjustable in respect to the other.

The improved apparatus is illustrated in the accompanying drawings, wherein like characters indicate like parts throughout the several views.

Referring to the drawings:

Fig. 1 is a side elevation showing the complete apparatus, some parts being broken away;

Fig. 2 is a fragmentary plan view showing a portion of the apparatus;

Fig. 3 is a transverse section taken on the line 3—3 of Fig. 2;

Fig. 4 is a transverse section taken completely through the apparatus on an extension of the line 3—3 of Fig. 2; some parts being broken away; and Fig. 5 is a view corresponding to Fig. 4, but showing the apparatus as applied to a tire of much smaller circumference and cross-sectional dimensions than the tire illustrated in Fig. 4.

In the drawings, of the parts of the tire there illustrated, the casing is indicated by the character $a$, the inner tube by the character $b$ and the rubber to be applied by the retreading apparatus is illustrated by the character $c$. The tire is shown as secured to the customary demountable wheel rim $d$.

Of the parts of the apparatus, the numeral 6 indicates the annular mold which, as shown and preferably, is of the character disclosed and claimed in my prior Patent No. 1,917,262, of date July 11, 1933, entitled "Apparatus for retreading tire casings". This annular mold is shown as surrounded by a steam conducting pipe coil 7, which will be in communication with a suitable source of steam supply and affords means for heating the mold to cure the retreading rubber c. The annular mold is preferably of a less diameter than the normal diameter of the tire casing and said casing with the new tread rubber c applied to the worn crown thereof may be readily inserted into this mold in accordance with the method disclosed and claimed in my prior Patent No. 1,917,261 of date July 11, 1933, entitled "Method of retreading tire casings". Otherwise stated, the flanges or sides of the tire will be laterally spread to an extent sufficient to decrease the radial diameter of the tire casing so that it may be readily placed within the annular mold.

The tire casing applied to the rim $d$ as shown in the drawings and with the retread rubber and the annular mold applied thereto will be placed between a pair of pressure plates 8 and 9, both of which are preferably of annular form, horizontally disposed so that the lower pressure plate 8 will serve as a table. This lower pressure plate 8 is supported by suitable posts or legs 10. With this arrangement, the tire will be first placed upon the lower or table-forming pressure plate 8 and the upper pressure plate 9 will then be placed on the upper side of the tire.

As suitable confining devices for preventing the spread of the pressure plates, I have shown a plurality of clamp yokes 11 pivoted at their lower ends to lugs 12 on the bottom of the plate 8 and provided at their upper ends with adjusting screws 13 that are engageable with the top of the upper plate 9. For convenience, the clamps 11 are arranged to work through the large openings in the annular pressure plates 8 and 9.

To prevent lateral shifting of the annular mold 6 during vulcanizing operation, anchoring devices are provided. These anchoring devices of which, as shown, there are three, are preferably constructed and arranged as follows: Strong arms 14 are pivoted on the legs 10 and vertical posts 15 are passed through the outer ends of said arms. These posts 15 are capable of vertical and oscillatory adjustments and are arranged to be firmly clamped to the arms 14 in desired adjustments by suitable means such as set screws 16. Anchoring fingers or projections 17 are secured to the upper ends of the posts 15 and co-operating lower fingers 18 are slidably mounted on the intermediate portions of the posts 15 and are clamped thereto by suitable means such as set screws 19.

The manner of using the apparatus described is preferably as follows:

The tread material c, that is, the uncured rubber, is first applied to the properly prepared tread portion of the tire casing. Then the tire, by lateral expansion of its beads and side walls, will be diametrically contracted so that it may be inserted into the relatively small annular mold 6 and then the beads of the tire are released, permitting the tire casing to circumferentially expand into engagement with the mold. Next, the beads of the tire are inserted in the wheel rim $d$. Then the tire is placed on the lower table-forming pressure plate 8 and the upper pressure plate 9 is then placed on the top of the casing. The inner tube of the tire is placed in the casing prior to application of the rim and may be given a light charge of air after the tire is applied to the wheel rim and before it is applied between the pressure plates, if desired. In any event, after the upper plate 9 has been placed upon the casing, the clamps or confining devices 11—13 will be applied as shown in Figs. 1, 4, and 5, so as to hold the sides of the tire casing against spreading action, and then the tire casing will be further charged with air so that there will be an internal pressure of say 100 pounds more or less, depending on the size of the tire. This assumed pressure of say 100 pounds causes the tread portion of the tire to expand circumferentially and forces the new tread rubber thereof outwardly and into complete contact with the cavities or channels of the annular mold and maintains the newly applied tread rubber under sufficient pressure for vulcanization.

Here it will be noted that it is highly important that the pressure plates 8 and 9 engage the opposite side or outer portions of the tire casing while the beads of the tire are held against movement by the wheel rim, thereby leaving only the tread portion of the tire free for outward movement under the air pressure. Obviously, the pressure plates when engaged with the tire and confined against spreading action, as described, serve several important functions, to wit:

(a) To relieve the side walls of the tire from excessive internal pressure during the vulcanizing operation.

(b) To hold the tire against shifting movements and afford a base of reaction for the mold anchoring devices; and (c) To increase the ability of the tread portion of the tire to expand outwardly, by limiting lateral expansion of the side wall portions of the tire. Even without the air pressure there is an outward expanding pressure produced on the tread portion of the tire when the sides of the tire, after having been abnormally spread, are released, but this air pressure is desirable in order to insure the tread rubber being pressed into all of the cavities and channels of the annular mold and being maintained under sufficient pressure during a subsequent heating or curing period.

In practice, I have found that when heat is applied to vulcanize the tread rubber onto the tire casing, the tread rubber becomes so fluid that the mold will shift laterally in respect to the pressure plates, or in other words, will not maintain the properly set position in respect to the tread portion of the tire casing; hence, the provision of so-called anchoring devices 15, 17 and 18. After the pressure plates have been applied and secured as above described and before the vulcanizing heat is applied by means of the steam coil, or any other means, the anchoring devices are set as shown in Figs. 1, 3, 4 and 5 so as to positively hold the annular mold against lateral shifting movements; and after this has been done, the vulcanizing heat will be applied to the mold. This vulcanizing heat in the mold shown is afforded by steam applied through the coil 7. Of course, the parts of the apparatus are held adjusted as shown in the drawings during the vulcanizing operation.

From the foregoing, it is evident that the same pressure plates 8 and 9 and their co-operating clamps or confining devices and the same anchoring devices may be used in connection with a very large number of annular molds that vary both in width and in diameter; and this is highly important both from a point of economical construction and facility of operation. As has already been indicated, it is here repeated that it is of the utmost importance that the pressure plates 8 and 9 are so extended in width or radially that they will engage the outermost sides of the tire casing both when the annular mold is of such diameter that it is between the pressure plates and when it is of such diameter that it is at the outermost portions of or beyond the perimeters of said pressure plates.

The manner of adjusting the anchoring devices for molds of different width has already been described. Said anchors, as is evident, may be adjusted radially in respect to the axis of the pressure plates for engagement with molds of varying diameter, by oscillatory movements of the arms 14 and of the fingers 17 and 18, all as clearly evidenced by reference particularly to Figs. 2, 4 and 5.

What I claim is:

1. A tire treading apparatus comprising an annular mold engageable circumferentially around a tire that has a greater transverse diameter than the width of said mold, pressure plates having faces engageable with the sides of the tire, means confining said pressure plates against separation under pressure exerted thereon by an interposed tire, and mold anchoring devices engageable with said mold for positively holding the same against lateral shifting movements in respect to said pressure plates.

2. A tire treading apparatus comprising an annular mold engageable circumferentially around a tire that has a greater transverse diameter than the width of said mold, pressure plates having faces engageable with the sides of the tire, means confining said pressure plates against separation under pressure exerted thereon by an interposed tire, and mold anchoring devices engageable with said mold for positively holding the same against lateral shifting movement in respect to said pressure plates, said anchors having spaced mold-engaging elements that are adjustable one in respect to the other and said confining means being adjustable to vary the spacing of said pressure plates.

3. The structure defined in claim 1 in which the mold-engaging elements of said anchoring devices are adjustable toward and from the axis of said mold.

4. The structure defined in claim 2 in which the mold engaging elements of said anchoring devices are adjustable toward and from the axis of said mold.

5. A tire treading apparatus comprising an annular mold engageable circumferentially around a tire that has a greater transverse diameter than the width of said mold, pressure plates having faces engageable with the sides of the tire, means confining the pressure plates against separation under pressure exerted thereon by an interposed tire, and mold-anchoring devices engageable with said mold for positively holding the same against lateral shifting movements in respect to said pressure plates, said pressure plates having parallel faces so extended radially of said mold that they will engage the sides of the tire at its maximum transverse diameter when said mold is located between said pressure plates and also when said mold is radially outward of said plates.

6. In a tire treading apparatus of the class described the combination of a pair of horizontally disposed pressure plates, the lower of said pressure plates being horizontally disposed and supported as a table upon which a tire may be laid and the upper thereof being applicable on top of a tire, and means for confining the pressure plates against spreading action when the tire is applied therebetween, the opposed faces of the pressure plates being parallel and so extended radially that they will engage the sides of an interposed tire at its maximum transverse diameter when the peripheral tread portion of the tire is directly between the plates and also when said tread portion is radially outward of said plates.

7. The structure defined in claim 6 in further combination with an annular mold engageable circumferentially around a tire positioned between the pressure plates, and anchoring devices adjustably applied to the said lower table-forming pressure plate and engageable with the annular mold to prevent shifting thereof in respect to said pressure plates.

8. The structure defined in claim 6 in further combination with an annular mold engageable circumferentially around a tire positioned between the pressure plates, and anchoring devices adjustably applied to one of said pressure plates and engageable with the annular mold to prevent shifting thereof in respect to said pressure plates.

9. A tire treading apparatus comprising an annular mold engageable circumferentially around a tire that has a greater transverse diameter than the width of said mold, pressure plates having faces engageable with the sides of the tire, confining devices restraining said pressure plates against separation under pressure exerted thereon by the tire, the faces of said pressure plates being so extended radially of said mold that they will engage the sides of tires of different sizes at their maximum transverse diameters, i. e., when said mold is located directly between and within the confines of said pressure plates, and also when said mold is radially outward of said plates.

10. A tire treading apparatus comprising an annular mold engageable circumferentially around a tire that has a greater transverse diameter than the width of said mold, pressure plates having parallel faces engageable with the sides of the tire, confining devices restraining said pressure plates against separation under pressure exerted thereon by the tire, the faces of said pressure plates being so extended radially of said mold that they will engage the sides of tires of different sizes at their maximum transverse diameters, i. e., when said mold is located directly between and within the confines of said pressure plates, and also when said mold is radially outward of said plates.

11. The structure defined in claim 10, in which said pressure plates and mold are horizontally disposed and the lower of said pressure plates serves as a table on which different sizes of tires may be supported while assembling said treading apparatus thereupon.

PAUL E. HAWKINSON.

DISCLAIMER 2,034,618.—*Paul E. Hawkinson*, Minneapolis, Minn. TIRE RETREADING APPARATUS. Patent dated March 17, 1936. Disclaimer filed August 15, 1940, by the assignee, *Paul E. Hawkinson Company*.

Hereby enters this disclaimer to claims 1, 2, 3, and 4 of said Letters Patent.

[*Official Gazette September 17, 1940.*]